(12) United States Patent
Sisto

(10) Patent No.: US 9,874,309 B2
(45) Date of Patent: Jan. 23, 2018

(54) SUPPORT ASSEMBLY

(71) Applicant: Salvatore Sisto, Bradley Beach, NJ (US)

(72) Inventor: Salvatore Sisto, Bradley Beach, NJ (US)

(*) Notice: Subject to any disclaimer, the term of this patent is extended or adjusted under 35 U.S.C. 154(b) by 0 days.

(21) Appl. No.: 14/934,429

(22) Filed: Nov. 6, 2015

(65) Prior Publication Data

US 2017/0130895 A1 May 11, 2017

(51) Int. Cl.
*F16M 13/02* (2006.01)
*A47K 3/12* (2006.01)
*A47B 96/02* (2006.01)
*A47K 17/02* (2006.01)

(52) U.S. Cl.
CPC ......... *F16M 13/025* (2013.01); *A47B 96/022* (2013.01); *A47K 3/125* (2013.01); *A47K 17/022* (2013.01)

(58) Field of Classification Search
CPC ... F16M 13/025; A47K 17/022; A47B 96/022
USPC .................... 248/297.21, 220.1, 222.14, 251
See application file for complete search history.

(56) References Cited

U.S. PATENT DOCUMENTS

| | | | | |
|---|---|---|---|---|
| 1,286,588 A * | 12/1918 | Goodykoontz | ...... | F16M 13/025 108/28 |
| 1,325,143 A * | 12/1919 | Conterio | .............. | F16M 13/025 108/152 |
| 2,182,600 A * | 12/1939 | Spetz | .................... | A47B 96/022 211/90.01 |
| 3,260,021 A * | 7/1966 | Katz | ...................... | A47K 10/10 211/105.1 |
| 3,580,397 A * | 5/1971 | Triplett | .................. | A47H 1/102 211/105.4 |
| 3,891,091 A * | 6/1975 | Anderson | ................ | A47H 1/08 211/105.3 |
| 4,102,529 A * | 7/1978 | Neblung | ............... | E04F 11/181 248/251 |
| 4,220,316 A * | 9/1980 | Naka | ................... | E04F 11/1836 256/1 |
| 5,042,766 A * | 8/1991 | Baker | .................. | F16M 13/025 248/200.1 |
| 5,154,384 A * | 10/1992 | Owens | ...................... | A47F 5/08 248/220.1 |
| 5,193,786 A * | 3/1993 | Guenther | ................ | E04F 11/18 256/59 |
| 5,469,682 A * | 11/1995 | Knight | .................. | E04F 19/028 256/59 |

(Continued)

FOREIGN PATENT DOCUMENTS

| | | | |
|---|---|---|---|
| DE | 19848697 A1 * | 4/2000 | ........... A47B 96/022 |
| JP | 2004332404 | * 11/2004 | |
| JP | 2004332404 A | * 11/2004 | |

*Primary Examiner* — Muhammad Ijaz
(74) *Attorney, Agent, or Firm* — Belles Katz LLC

(57) ABSTRACT

A support assembly and a method of assembling the support assembly that includes a structural member that is delimited by a first end and a second end with a first end cap configured to be arranged within the first end of the structural member and a second end configured to be arranged within the second end of the structural member to mount the structural member to a structure. The support assembly allows for forces to be applied in all directions without causing rotation or disengagement of the support assembly from a mounting structure.

16 Claims, 17 Drawing Sheets

(56) References Cited

U.S. PATENT DOCUMENTS

| | | | | |
|---|---|---|---|---|
| 6,386,518 B1* | 5/2002 | Shreiner | ............. | E04F 11/1804 |
| | | | | 256/65.01 |
| 8,070,137 B2* | 12/2011 | Bennett | ................ | A47K 17/022 |
| | | | | 256/65.15 |
| 8,839,980 B2* | 9/2014 | Baines | ................... | A47K 3/281 |
| | | | | 211/90.03 |
| 2003/0209642 A1* | 11/2003 | Fontana | ................ | A63B 27/00 |
| | | | | 248/231.91 |
| 2008/0179476 A1* | 7/2008 | McGinness | ......... | E04F 11/1804 |
| | | | | 248/220.21 |
| 2011/0155880 A1* | 6/2011 | Stimpson | .................. | E03C 1/06 |
| | | | | 248/285.1 |

* cited by examiner

SUPPORT ASSEMBLY

FIELD OF THE INVENTION

The present invention relates generally to a supporting structure and more particularly to a support assembly that is mountable between two converging structures.

BACKGROUND OF THE INVENTION

Support assemblies and more specifically support assemblies that are mountable in a corner of a room between two converging walls are known. These support assemblies, such as foot rests, grab bars, and shelving systems are commonly used, for example, in household showers, locker rooms, spas and the like. However, existing support assemblies do not allow for any significant force to be applied thereon without the support assembly rotating and/or becoming disengaged from a fixed position. As such, an individual can be severely injured due to the limited force that can safely sustained by known support assemblies.

SUMMARY OF THE INVENTION

The present invention is directed to a support assembly that allows for significant forces to be applied in all directions without causing rotation or disengagement of the support assembly from a mounting structure. This is because, as will be described in more detail below, the end caps of the support assembly are not mounted in parallel to each other. As a result, the rotational axes of the end caps contrast each other and in turn stabilize a structure extending between and from the end caps. Moment forces only exist in the area of the structure that exceeds the axes of the end caps. As such, the moment forces are minimized and the torsion forces are negated by opposing each other resulting in an assembly that is stable and does not rotate upon a force being applied thereto.

In an embodiment, the present invention is directed to a support assembly that comprises a structure that has an outer surface and inner surface and that is delimited by a first and second end, a first end cap that includes a first body which has a first element (e.g., trapezoidal, triangular) that extends therefrom and that is configured to be arranged within the first end of the structure and a second end cap that includes a second body which has a second element (e.g., trapezoidal, triangular) that extends therefrom and that is configured to be arranged within the second end of the structure. In an embodiment, the structure can be a tubular member, a cantilevered plate or any other structure that extends between the end caps.

In an embodiment, the first and second ends of the structure lie in planes such that a first plane extends along the first end of the structure and a second plane extends along the second end of the structure to converge and intersect each other at a line centrally located between the ends of the structure. In an embodiment, the planes in which the first and second end of the structure lie are angled at approximately 45 degrees with respect to the axis of the structure so that the planes meet at angles of approximately 90 degrees.

In an embodiment, the first end cap is sized to encompass the first end of the structure and the second end cap is sized to encompass the second end of the structure. In an embodiment, the first and second end caps each have a body that is substantially ovoid to encompass the first and second end that are also substantially ovoid.

In an embodiment, the first end cap includes an opening extending through the first body and the first trapezoidal element and the second end cap includes an opening extending through the second body and the second trapezoidal element of the second end cap.

In an embodiment, the first trapezoidal element can substantially encompass a longitudinal diameter of the first body of the first end cap and the second trapezoidal element can substantially encompass a longitudinal diameter of the second body of the second end cap.

In an embodiment, the support assembly can further comprise a first insert fixed within the first end of the structure that includes a first slot configured to receive the first trapezoidal element and a second insert fixed within the second end of the structure that includes a second slot configured to receive the second trapezoidal element.

In an embodiment, the first insert and the second insert can include a base, a first projection extending from the base that has an outer surface which is contoured to be contactable with the inner surface of the structure and a second projection spaced from the first projection by the first slot extending from the base that has an outer surface that is contoured to be contactable with the inner surface of the body of the structure. In an embodiment, the first and second projections of the first and second inserts can each extend from the base of the insert at an angle that is substantially similar to the angle of the first end of the structure. In an embodiment, the angle at which the ends and projections extend is about 45 degrees.

In an embodiment, the support assembly can include a first opening extending between the outer and inner surface near the first end of the structure and a second opening extending between the outer and inner surface near the second end of the structure, a first hole extending through one of the first projection and the second projection of the first insert with the first insert adaptable such that the first hole is in alignment with the first opening and a second hole extending through one of the first projection and the second projection of the second insert with the second insert adaptable such that the second hole is in alignment with the second opening.

In an embodiment, the support assembly can include a first fastener extending through the first opening in the structure and the first hole in the first insert to fix the first end cap within the structure and a second fastener extending through the second opening in the structure and the second hole in the second insert to fix the second end cap within the structure. In an embodiment, the first fastener and the second fastener are each set screws.

In an embodiment, the structure, the first end cap and the second end cap can each be comprised of a metal, such as stainless steel and at least a region of the outer surface of the body of the tubular member can have an anti-slip surface.

In an embodiment, the present invention is directed to a method of assembling a corner support assembly. The method comprises the steps of providing a structural member that has an outer surface and an inner surface and that is delimited by a first end and a second end, a first end cap that includes a first body having a first surface and a second surface with a first trapezoidal element that is configured to be arranged within the first end of the structural member extending from the first body and a second end cap including a second body that has first surface and a second surface with a second trapezoidal element that is configured to be arranged within the second end of the structural member extending from the second body, fastening the first end cap to a first structure and the second end cap to a second structure such that the first trapezoidal element and the second trapezoidal element project from the first structure and second structure, respectively, orientating the first end of the structural member to encompass the first trapezoidal element and the second end of the structural member to encompass the second trapezoidal element and fixing the structural member to the first end cap and the second end cap.

DETAILED DESCRIPTION OF EMBODIMENTS OF THE INVENTION

Figure 16:
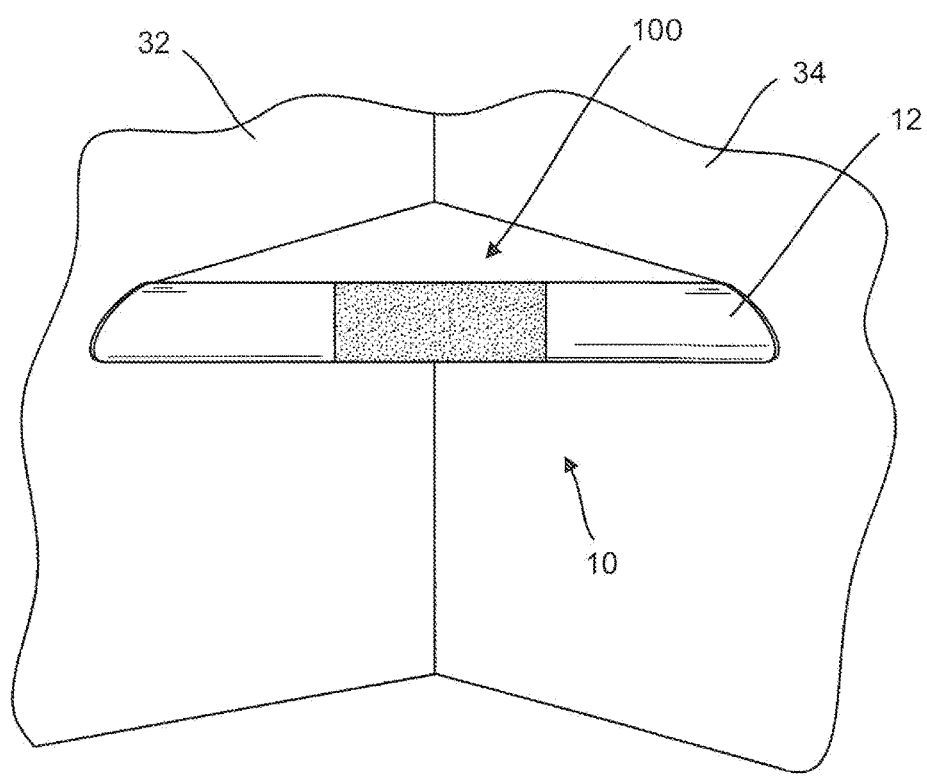
FIG. 16 is a perspective view of the support assembly in an assembled state, fixed to a structure that includes a cantilevered plate.
Figure 17:
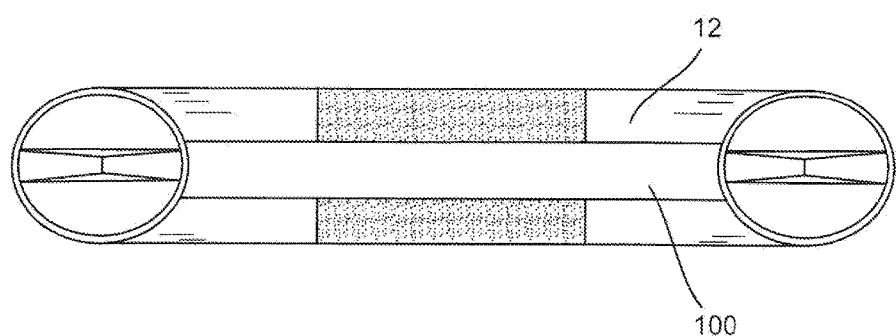
FIG. 17 is a rear view of FIG. 16.
Figure 18:
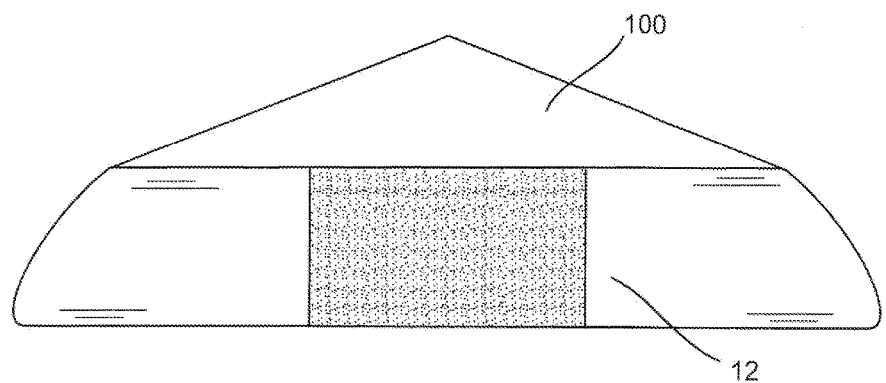
FIG. 18 is a front view of FIG. 16.

FIGS. 1-18 illustrate an embodiment of a support assembly, which is designated hereinafter by reference numeral 10. As will be described in more detail below, in general the support assembly 10 includes a substantially tubular member 12, a first insert 14, a second insert 16, a first end cap 18, a second end cap 20 and a plurality of fasteners 22A, 22B. The support assembly 10 can be used, for example, as a foot rest, a grab bar, a mounting structure in conjunction with bath accessories or as support for any structure (e.g., shelving). Although the support assembly 10 is shown as including a tubular member 12 that is substantially cylindrical, the tubular member 12 can be any supporting body of any shape that extends between at least a first end cap and a second end cap. For example, as shown in an embodiment in FIGS. 16-18, the support assembly includes a shelving support 100 that includes a cantilevered plate attached (e.g., welded) to a tubular member.

As shown in an embodiment in FIGS. 1-15, the tubular member 12 is an elongated hollow cylindrical structure that includes an outer surface 24 and an inner surface 26 and that is delimited between a first end 28 and a second end 30. The first end 28 and the second end 30 of the tubular member 12 are both angled such that a first plane extending along the first end 28 and a second plane extending along the second end 30 converge and intersect each other at a central point between the ends 28, 30 of the tubular member 12. As such, in an embodiment, the first angled end 28 and the second angled end 30 allow for the support assembly 10 to be mounted between two converging surfaces 32, 34 (See FIGS. 14 and 15) that are substantially perpendicular to each other. In an embodiment, the first end 28 and the second end 30 are both angled at approximately about 45 degrees.

As will be explained in more detail below, as shown in FIGS. 1, 2 and 5-8, a first opening 36 extends through the tubular member 12 substantially transverse to and near the first end 28 of the tubular member 12 and a second opening 38 extends through the tubular member 12 substantially transverse to and near the second end 30 of the tubular member 12.

Figure 1:
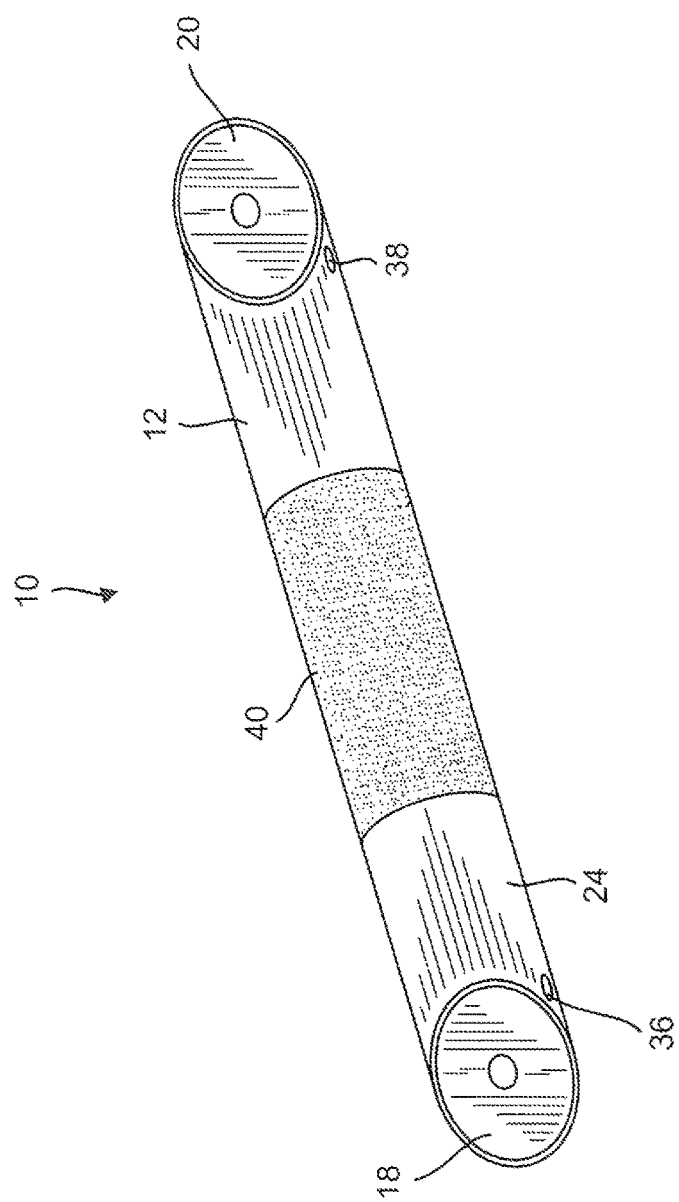
FIG. 1 is a perspective view of an embodiment of a support assembly of the present invention.
Figure 2:
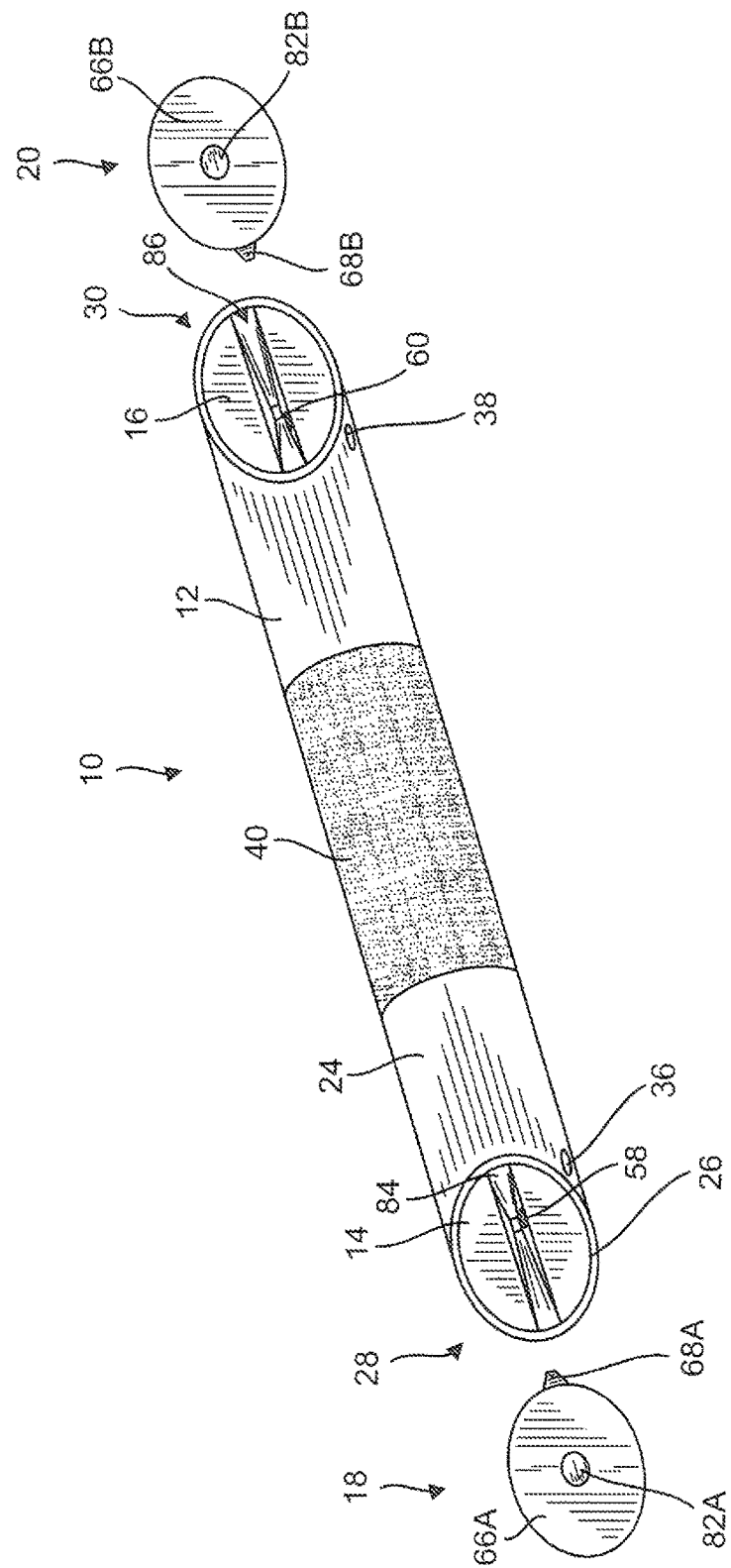
FIG. 2 is a perspective view of the support assembly of FIG. 1 with the end caps in an uninstalled state.
Figure 3:
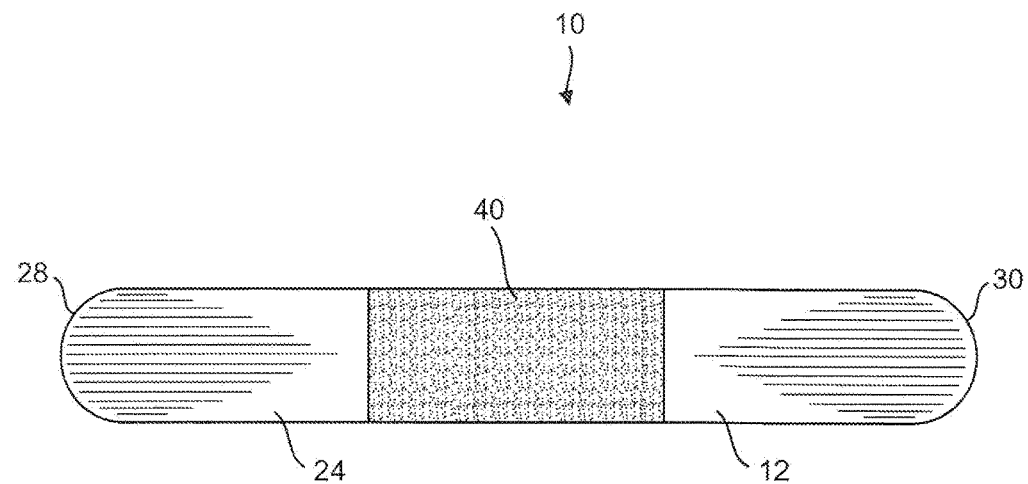
FIG. 3 is a front view of the support assembly of FIG. 1.
Figure 4:
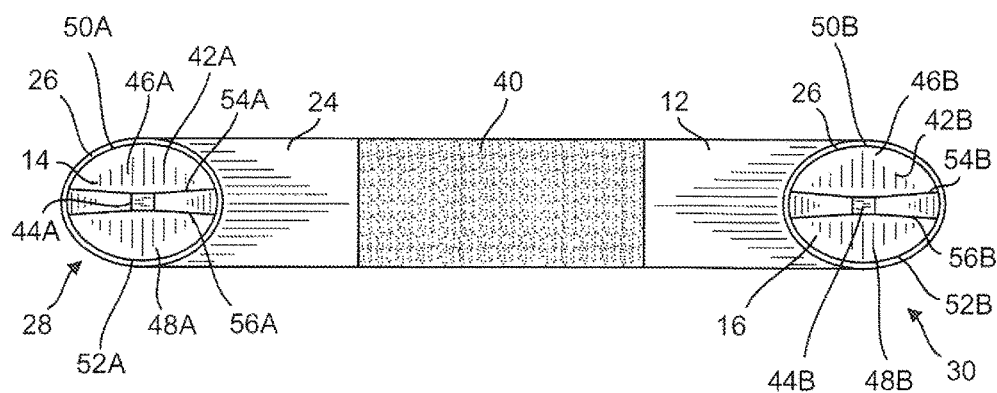
FIG. 4 is a rear view of the support assembly of FIG. 1.
Figure 5:
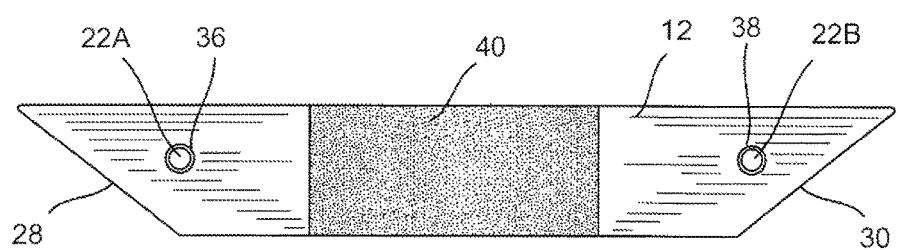
FIG. 5 is a bottom view of the support assembly of FIG. 1.
Figure 6:
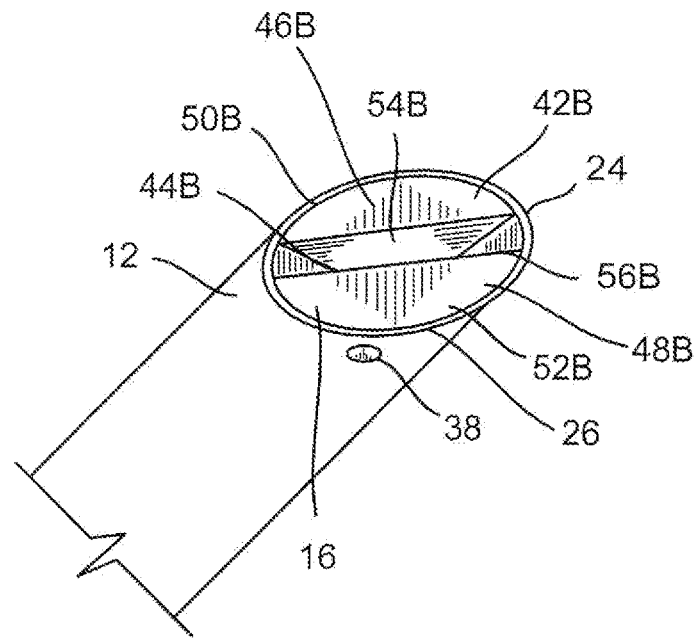
FIG. 6 is a first perspective view of an end of the support assembly of FIG. 1.

As shown in an embodiment in FIG. 2, the first end 28 and the second end 30 of the tubular member 12 are substantially ovoid. In an embodiment, the tubular member 12 is formed from metal such as stainless steel (e.g., 18/8 (304) stainless steel). However, the tubular member 12 can be formed from any material that is known or may become known that allows for sustaining a force to be applied thereto. As can be seen in an embodiment in FIG. 1, an anti-slip grip 40 can extend about at least a portion of the outer surface 24 of the tubular member 12.

As depicted, for example, in FIG. 2, the first insert 14 is fixed within the first end 28 of the tubular member 12 and the second insert 16 is fixed within the second end 30 of the tubular member 12. The first insert 14 and second insert 16 can be fixed within the tubular member by press fit, welding, bonding (e.g. using an adhesive), fastening or the like.

Figure 7:
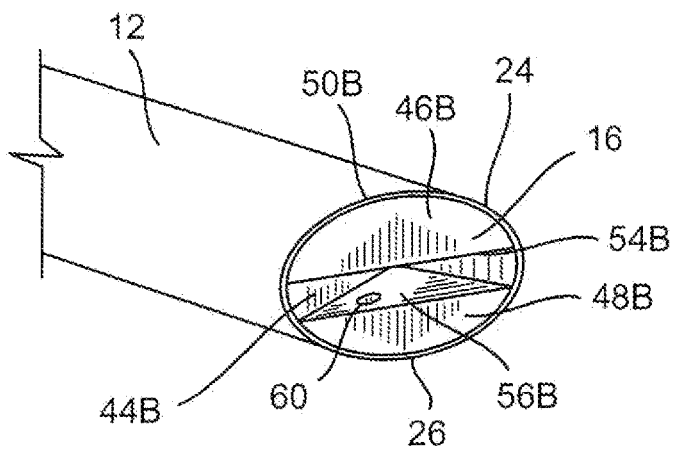
FIG. 7 is a second perspective view of an end of the support assembly of FIG. 1.
Figure 8:
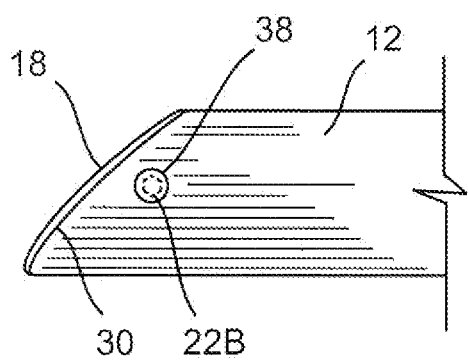
FIG. 8 is a partial bottom view of an end of the support assembly of FIG. 1.
Figure 9A:
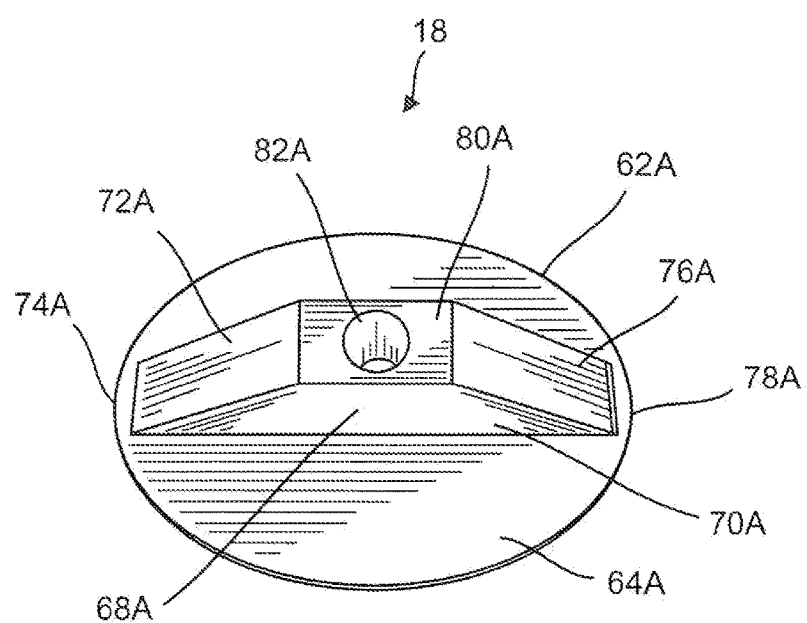
FIG. 9A is a perspective view of a first end cap of the support assembly of FIG. 1.
Figure 9B:
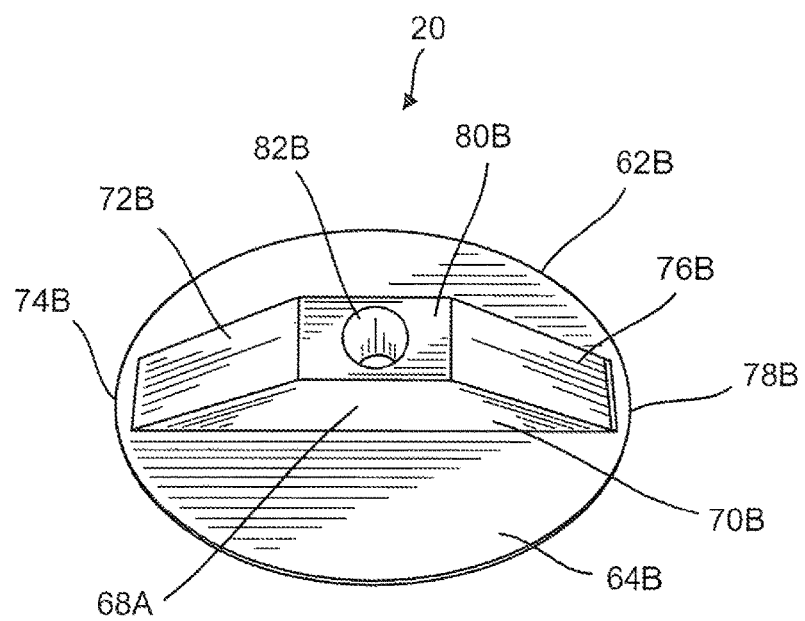
FIG. 9B is a perspective view of a second end cap of the support assembly of FIG. 1.
Figure 10A:
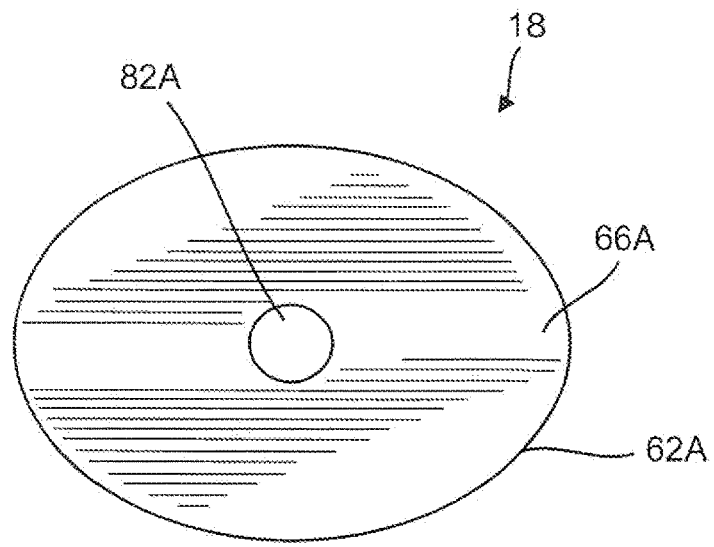
FIG. 10A is a front view of the first end cap of the support assembly of FIG. 1.
Figure 10B:
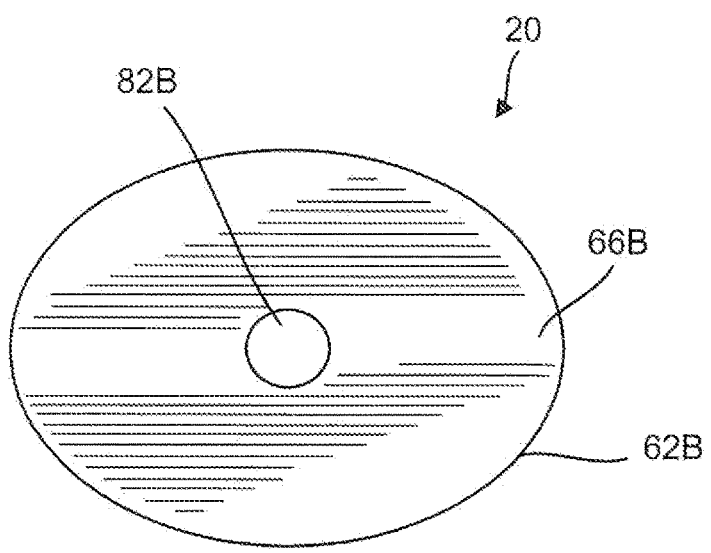
FIG. 10B is a front view of the second end cap of the support assembly of FIG. 1.
Figure 11A:
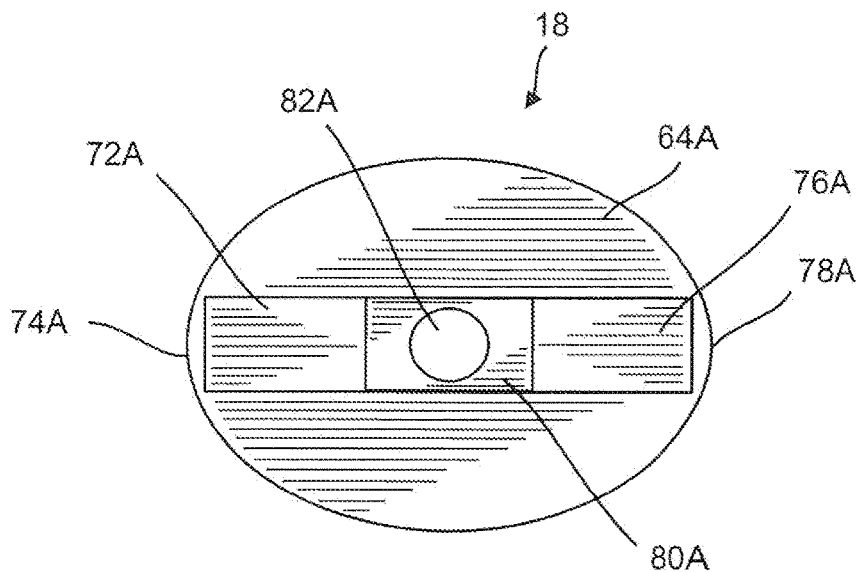
FIG. 11A is a rear view of the first end cap of the support assembly of FIG. 1.
Figure 11B:
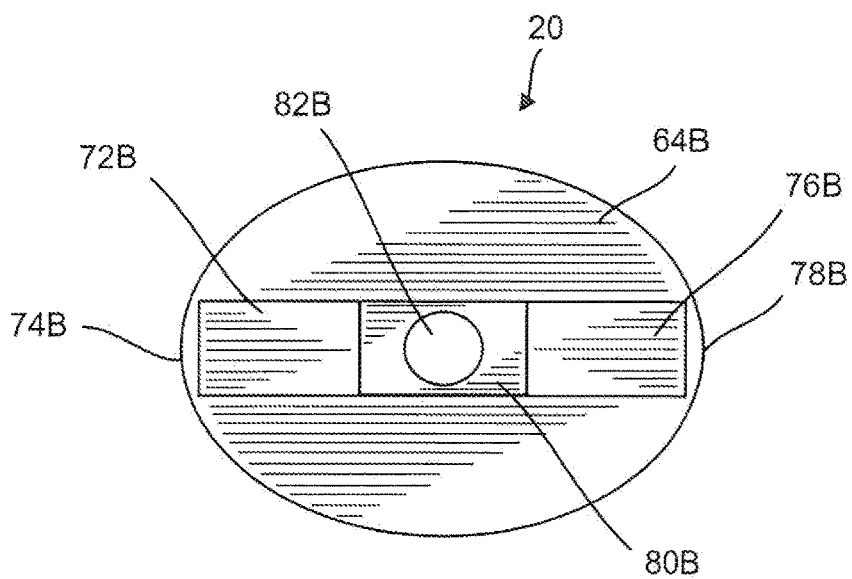
FIG. 11B is a rear view of the second end cap of the support assembly of FIG. 1.
Figure 12A:
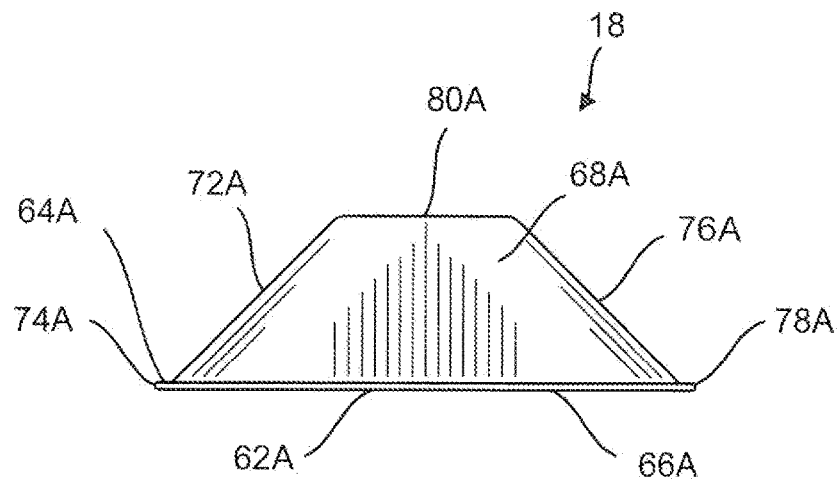
FIG. 12A is a top view of the first end cap of the support assembly of FIG. 1.
Figure 12B:
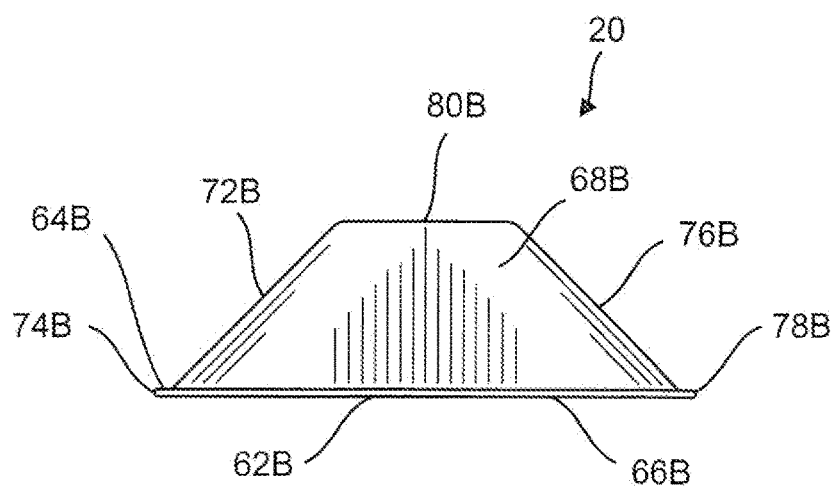
FIG. 12B is a top view of the second end cap of the support assembly of FIG. 1.
Figure 13A:
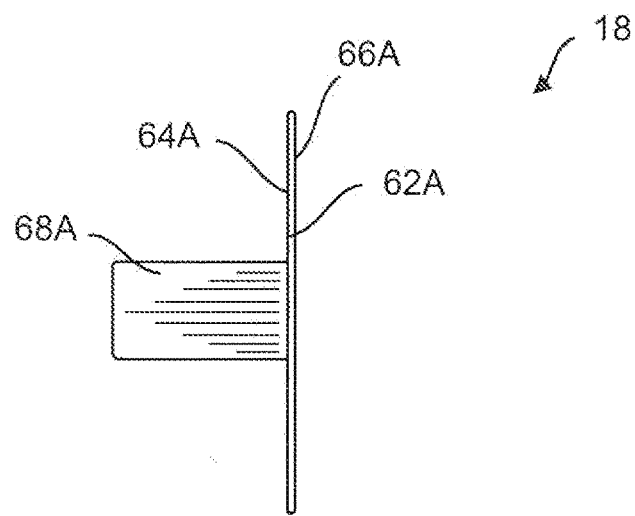
FIG. 13A is a side view of the first end cap of the support assembly of FIG. 1.
Figure 13B:
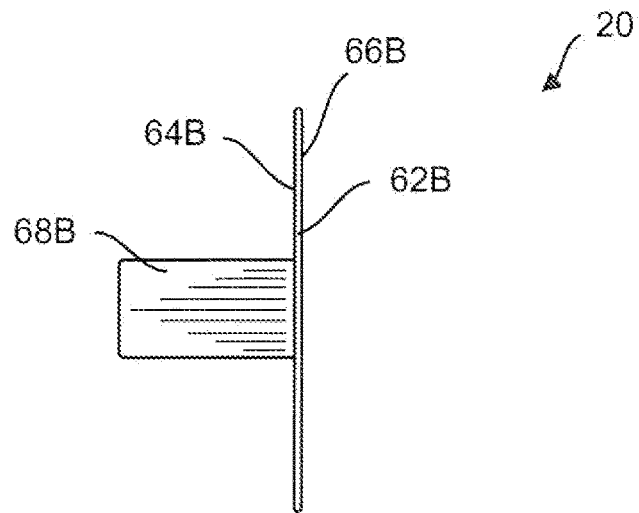
FIG. 13B is a side view of the second end cap of the support assembly of FIG. 1.

In an embodiment, the first insert 14 and the second insert 16, respectively include a body 42A, 42B that has a base 44A, 44B, a first projection 46A, 46B that extends from the base 44A, 44B in a first direction and a second projection 48A, 48B that is spaced from the first projection 46A, 46B and extends from the base 44A, 44B in the first direction as well. Both the first projection 46A, 46B and the second projection 48A, 48B include an outer surface 50A, 50B, 52A, 52B, respectively, that is contoured to be contactable with the inner surface 26 of the tubular member 12 and an inner surface 54A, 54B, 56A, 56B that extends substantially linearly from the base 44A, 44B of the first and second insert 14, 16, respectively. In an embodiment, the outer surfaces 50A, 50B, 52A, 52B of the inserts 14, 16 are substantially ovoid. As can be seen in FIG. 2, the first and second projections 46A, 46B, 48A, 48B extend at an angle from the base 44A, 44B that is substantially the same as the angle of the first end 28 of the tubular member 12. As such, the inner surfaces 54A, 54B, 56A, 56B of the projections 46A, 46B, 48A, 48B are substantially triangular. In an embodiment as shown in FIG. 7, the inner surfaces 54A, 54B, 56A, 56B of the first and second projection 46A, 46B, 48A, 48B each form a right triangle. However, the inserts 14, 16 can be configured to be any shape and/or size to accommodate the end caps 18, 20.

As shown in an embodiment in FIG. 2, a first hole 58 extends through one of the first projection 46A and the second projection 48A of the first insert 14 with the first insert 14 adaptable such that the first hole 58 is in alignment with the first opening 36 formed in the tubular member 12. As shown in FIGS. 2 and 7, a second hole 60 extends through one of the first projection 46B and the second projection 48B of the second insert 16, which is adaptable so that the second hole 60 is in alignment with the second opening 38. In an embodiment, the first hole 58 can be formed in both the first projection 46A and the second projection 48A of the first insert 14 and the second hole 60 can be formed in both the first projection 46B and the second projection 48B of the second insert 16.

FIGS. 9-13 illustrate an embodiment the first end cap 18 and the second end cap 20 that are configured to be arranged within the first insert 14 and the second insert 16, respectively, to fix the tubular member 12 to a structure. The first end cap 18 and the second end cap 20, respectively include a body 62A, 62B that has a first surface 64A, 64B and a second surface 66A, 66B, which opposes the first surface 64A, 64B. As shown in an embodiment in FIGS. 9-11, the body 62A, 62B of the first and second end cap 18, 20, respectively, is substantially ovoid. A trapezoidal element 68A, 68B extends, respectively, from the first surface 64A, 64B of the body 62A, 62B of the end caps 18, 20. In an embodiment, the body 62A, 62B is substantially ovoid. However, the end caps can be of any shape and the elements that extend from the end caps can also be of any shape that substantially matches the opening within the inserts 12, 14.

In an embodiment, the trapezoidal element 68A, 68B includes a first base 70A, 70B that substantially extends along longitudinal diameter from the first surface 64A, 64B of the body 62A, 62B of the end caps 18, 20, a first sidewall 72A, 72B extends at or near a first end 74A, 74B of the first base 70A, 70B at an angle, a second sidewall 76A, 76B extends at or near a second end 78A, 78B of the first base 70A, 70B at an angle and a second base 80A, 80B that is spaced from and substantially parallel to the first base 70A, 70B and that extends substantially between the first sidewall 72A, 72B and the second sidewall 76A, 76B. With the trapezoidal element 68A, 68B encompassing the end caps 18, 20 and interacting with the inserts 14, 16, respectively, rotational forces are substantially mitigated.

Figure 14:
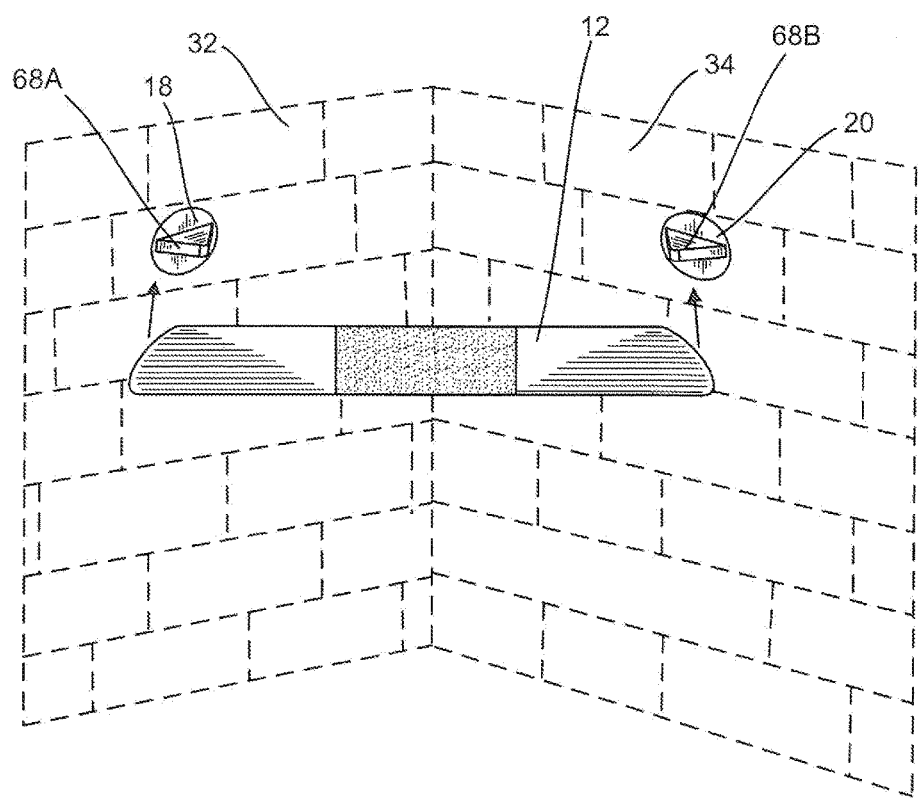
FIG. 14 is an installation view of the end caps and tubular member of the support assembly being fixed to a structure.
Figure 15:
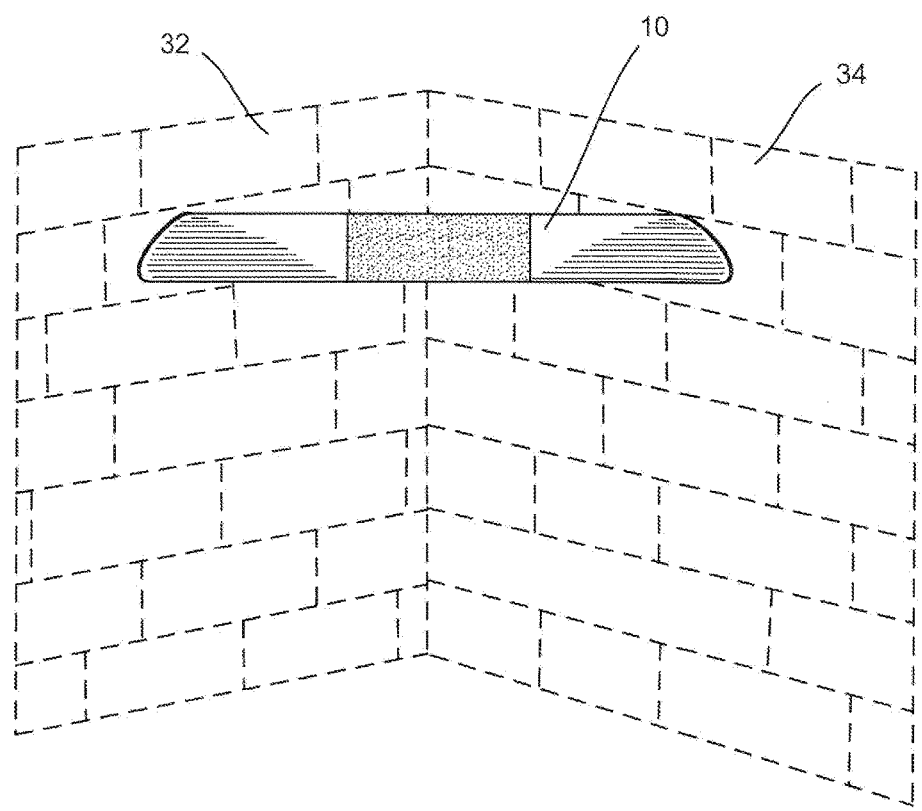
FIG. 15 is a perspective view of the support assembly in an assembled state, fixed to a structure.

In an embodiment, the trapezoidal element 68A, 68B includes an opening 82A, 82B through which a fastener (e.g., a screw) can extend to fix the trapezoidal element 68A, 68B to a structure (see e.g., FIGS. 14 and 15). As can be seen in an embodiment in FIGS. 9-11, the opening 82A, 82B extends centrally from the second surface 66A, 66B of the body 62A, 62B of each of the end caps 18, 20 through the first base 70A, 70B and second base 80A, 80B of the trapezoidal element 68A, 68B. The trapezoidal element 68A, 68B herein allow room for the head of a mounting screw.

As shown in FIG. 14, upon fastening the end caps 18, 20 to a structure, the tubular element 12 can be slide over the trapezoidal elements 68A, 68B, arranging the first trapezoidal element 68A within a slot 84 of the first insert 14 formed between the inner surface 54A, 56A of the first and second projections 46A, 48A and the second trapezoidal element 68B within the slot 86B formed between the inner surface 54B, 56B of the first and second projections 46B, 48B of the second insert 16. A first fastener 22A can be inserted through the first opening 36 in the tubular member 12 and the first hole 58 of the first insert 14 and contact the trapezoidal element 68aA to fix the first end cap 18 within the tubular member 12 and a second fastener 22B to be inserted through the second opening 38 in the tubular member 12 and the second hole 60 of the second insert 48 and contact the trapezoidal element 68B to fix the second end cap 20 within the tubular member 12. In an embodiment, the first hole 58 of the first insert 14 and the second hole 60 of the second insert 16 include threading (not shown) extending about each opening 58, 60 and the fastener 22A, 22B is a set screw that fixes the end caps 18, 20 within the inserts 14, 16 and to the tubular member 12.

Because the end caps 18, 20 are not mounted in parallel to each other the rotational axes of the end caps 20, 22 contrast each other, the rotational axes of the end caps 18, 20 contrast each other and in turn stabilize the tubular element. The moment forces only exist in the area of the tubular element 12 that exceeds the axes of the end caps 18, 20. As such, the moment forces are minimized and the torsion forces are negated by opposing each other resulting in an assembly that is stable and does not rotate upon a force being applied thereto.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

What is claimed is:

1. A support assembly, comprising:
    a structural member extending linearly along a first axis and being delimited by a first end extending at a first angle and a second end extending at a second angle such that a first plane extends along the first end of the structural member and a second plane extends along the second end of the structural member;
    a first end cap being mountable to a first surface which extends about a third plane and including a first body having a first protrusion extending therefrom along a second axis that is configured to be arranged within the first end of the structural member; and
    a second end cap being mountable to a second surface that extends about a fourth plane which converges with and intersects the third plane and including a second body having a second protrusion extending therefrom along a third axis that is configured to be arranged within the second end of the structural member,
    wherein when mounted, the protrusion of the first end cap is arranged within the first end of the structural member at a first angle such that the first axis of the structural member and the second axis of the first end cap intersect and the second protrusion of the second end cap is arranged within the second end of the structural member at a second angle such that the first axis of the structural member and the third axis of the second end cap intersect, precluding rotation of the support assembly;
    a first insert fixed within the first end of the structural member that includes a first slot configured to receive the first protrusion and a second insert fixed within the second end of the structural member that includes a second slot configured to receive the second protrusion; and wherein the first insert includes a base, a first projection extending from the base of the first insert that has an outer surface contoured to be contactable with an inner surface of the structural member and a second projection spaced from the first projection of the first insert by the first slot extending from the base of the first insert that has an outer surface that is contoured to be contactable with the inner surface of the structural member, and the second insert includes a base, a first projection extending from the base of the second insert that has an outer surface that is contoured to be contactable with the inner surface of the structural member and a second projection spaced from the first projection of the second insert by the second slot extending from the base of the second insert that has an outer surface that is contoured to be contactable with the inner surface of the structural member.

2. The support assembly of claim 1, wherein the first end cap is sized to encompass the first end of the structural member and the second end cap is sized to encompass the second end of the structural member.

3. The support assembly of claim 1, wherein the first body of the first end cap and the second body of the second end cap are both ovoid.

4. The support assembly of claim 3, wherein the first protrusion substantially encompasses a longitudinal diameter of the first body of the first end cap and the second protrusion substantially encompasses a longitudinal diameter of the second body of the second end cap.

5. The support assembly of claim 1, wherein the first protrusion of the first end cap is trapezoidal and the second protrusion of the second end cap is trapezoidal.

6. The support assembly of claim 1, wherein the first end cap includes an opening extending through the first body and the first protrusion and the second end cap includes an opening extending through the second body and the second protrusion.

7. The support assembly of claim 1, wherein the structural member, the first end cap and the second end cap are each comprised of stainless steel.

8. The support assembly of claim 1, wherein at least a region of an outer surface of the structural member has an anti-slip surface.

9. The support assembly of claim 1, wherein the first and second projections of the first insert each extend at an angle from the base of the first insert that is substantially similar to the angle of the first end of the structural member, and wherein the first and second projections of the second insert each extend at an angle from the base of the second insert that is substantially similar to the angle of the second end of the structural member.

10. A support assembly, comprising:
a structural member extending linearly along a first axis and being delimited by a first end extending at a first angle and a second end extending at a second angle such that a first plane extends along the first end of the structural member and a second plane extends along the second end of the structural member;
a first end cap being mountable to a first surface which extends about a third plane and including a first body having a first protrusion extending therefrom along a second axis that is configured to be arranged within the first end of the structural member;
a second end cap being mountable to a second surface that extends about a fourth plane which converges with and intersects the third plane and including a second body having a second protrusion extending therefrom along a third axis that is configured to be arranged within the second end of the structural member,
wherein when mounted, the protrusion of the first end cap is arranged within the first end of the structural member at a first angle such that the first axis of the structural member and the second axis of the first end cap intersect and the second protrusion of the second end cap is arranged within the second end of the structural member at a second angle such that the first axis of the structural member and the third axis of the second end cap intersect, precluding rotation of the support assembly;
a first insert fixed within the first end of the structural member that includes a first slot configured to receive the first protrusion and a second insert fixed within the second end of the structural member that includes a second slot configured to receive the second protrusion; and
a first opening extending between an outer surface and an inner surface of the structural member, near the first end of the structural member and a second opening extending between the outer surface and the inner surface of the structural member, near the second end of the structural member, a first hole extending through one of a first projection and a second projection of the first insert with the first insert adaptable such that the first hole is in alignment with the first opening and a second hole extending through one of a first projection and a second projection of the second insert with the second insert adaptable such that the second hole is in alignment with the second opening.

11. The support assembly of claim 10, further comprising a first fastener extending through the first opening in the structural member and the first hole of the first insert to fix the protrusion of the first end cap within the structural member and a second fastener extending through the second opening in the structural member and the second hole of the second insert to fix the protrusion of the second end cap within the structural member.

12. The support assembly of claim 10, wherein the first fastener and the second fastener are each set screws.

13. The support assembly of claim 1, wherein the structural member is a tubular member.

14. A method of assembling corner support assembly, the method comprising:
providing a structural member extending linearly along a first axis and being delimited by a first end extending at a first angle and a second end extending at a second angle such that a first plane extends along the first end of the structural member and a second plane extends along the second end of the structural member, a first end cap including a first body having a first protrusion that is configured to be arranged within the first end of the structural member and a second end cap including a second body having a second protrusion that is configured to be arranged within the second end of the structural member;
fastening the first end cap to a first structure that extends along a third plane and the second end cap to a second structure that extends along a fourth plane which converges with and intersects the third plane such that the first structural element and the second structural element extend in non-parallel planes to each other with the first protrusion extending from the first structure along a second axis and the second protrusion extending from the second structure along a third axis with the second axis and the third axis converging toward each other;

orientating the first end of the structural member to encompass the first protrusion such that the first axis of the structural member and the second axis of the first end cap intersect and orientating the second end of the structural member to encompass the second protrusion such that the first axis of the structural member and the third axis of the second end cap intersect, precluding rotation of the support assembly and eliminating moment forces on the support assembly;

fixing the structural member to the first protrusion of the first end cap and the second protrusion of the second end cap; and wherein the structural member includes a first opening near the first end extending between an outer surface and an inner surface of the structural member, a hole extending through one of a first projection and a second projection of the first insert that is aligned with the first opening, a second opening extending between the outer and inner surface of the structural member near the second end and a hole extending through one of a first projection and a second projection of the second insert that is aligned with the second opening.

15. The method of claim 14, wherein a first set screw is arranged in the first opening of the structural member and the hole of the first insert to fix the first insert to the structural member a second set screw is arranged in the second opening of the structural member and the hole of the second insert to fix the second insert to the structural member.

16. The support assembly of claim 14, wherein the structural member is a tubular member.

\* \* \* \* \*